Dec. 29, 1970

W. D. CHAPMAN 3,550,201

VERTICAL MIXER, KNEADER AND REACTOR FOR
PLASTIC MATERIALS AND THE LIKE

Filed Jan. 22, 1968

INVENTOR
WILLIAM D. CHAPMAN
BY his attorneys,
Learman, Learman & McCulloch

United States Patent Office 3,550,201
Patented Dec. 29, 1970

3,550,201
VERTICAL MIXER, KNEADER AND REACTOR FOR PLASTIC MATERIALS AND THE LIKE
William D. Chapman, Saginaw, Mich., assignor to Baker Perkins Inc., Saginaw, Mich., a corporation of New York
Filed Jan. 22, 1968, Ser. No. 699,494
Int. Cl. B29f 3/02
U.S. Cl. 18—12                 9 Claims

ABSTRACT OF THE DISCLOSURE

A mixer having a generally vertically disposed barrel defining a vertically extending chamber in which a generally vertically disposed mixer shaft is mounted for rotation and reciprocation, a hopper for supplying material to the upper end of the chamber, and interrupted helical flights provided on the shaft to cooperate with radially inwardly projecting, stationary lugs on the barrel.

---

Horizontally disposed mixers of the type disclosed in Geier and Irving U.S. Pat. No. 3,023,455 have attained considerable commercial success and have been employed in the chemical and plastics industries to process a variety of materials which are to be mixed and kneaded or extruded in a continuous manner.

One of the prime objects of the present invention is to provide a machine of this general character which has a vertically disposed mixing chamber and achieves important advantages. For example, one of the high cost mechanisms which is necessarily employed with machines having horizontal chambers is a power feeder for supplying metered amounts of material to the charge end of the mixer. With a vertically chambered mixing machine of the character to be described, a hopper can empty directly into the upper end of the mixer chamber and the end of the mixer shaft may be extended up into the hopper and provided with material agitator means thereon which is both reciprocated and rotated to better feed the material and vent the air in the incoming material. Prior art machines have also required heavy bases to support the mixer shafts horizontally, and the mixer shafts have had to be cantilever supported. In the mixer which will be described the major load on the screw is axial. Also, in handling the material, the flighted mixing shaft is in tension and pulling, rather than in compression and pushing.

Another object of the invention is to provide a machine of the character described wherein heat transfer effects are improved because only two rows of kneading pins need be provided on the barrel and interfere with the heating jacket.

A final object of the invention is to provide barrel pins extending from removable plates in pairs to replace the teeth which have formerly been employed, the pins accomplishing the purpose in a more economical and improved manner.

Other objects and advantages of the invention will be pointed out specifically or will become apparent from the following description when it is considered in conjunction with the appended claims and the accompanying drawings, in which:

Figure 1:
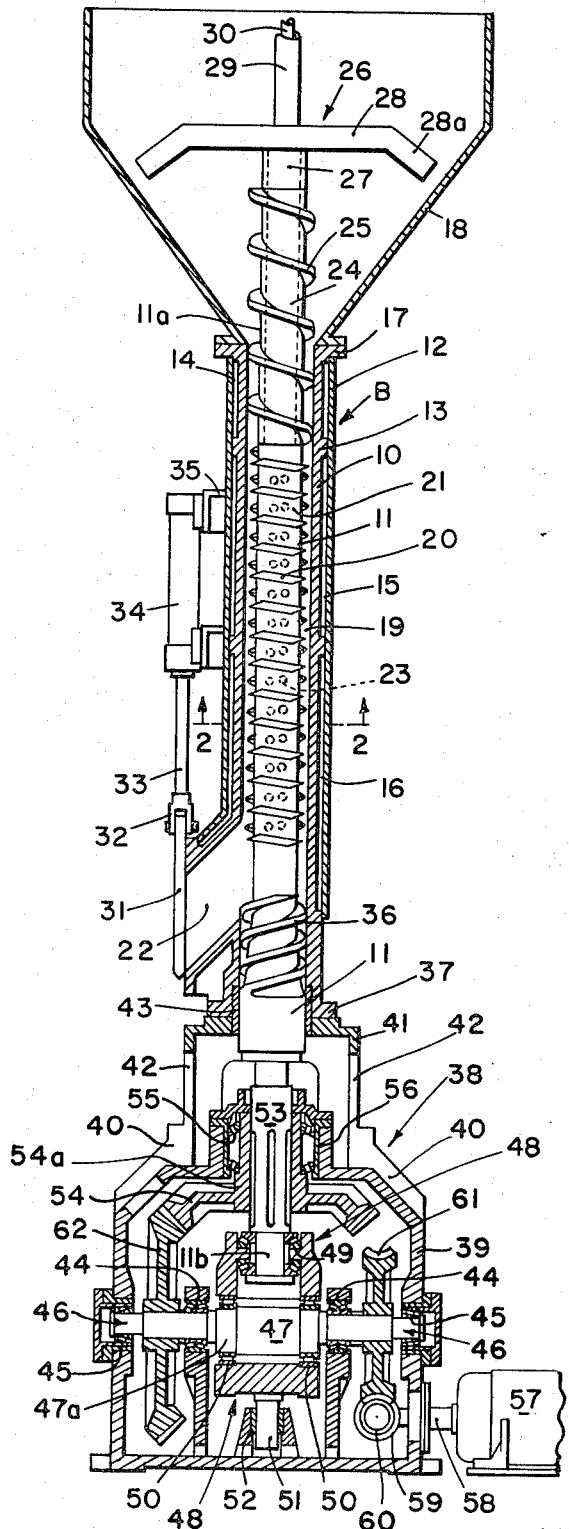
FIG. 1 is a vertical sectional view through the machine.

Referring now more particularly to the accompanying drawings, in which only a preferred embodiment of the invention is illustrated, a letter B generally refers to a tubular mixing barrel (FIG. 1) which includes a housing or casing 10 for a mixing and kneading shaft or worm 11 and outer jackets 12 defining, with ring members 13, a plurality of jacketed chambers 14, 15 and 16, as shown. Suitable supply and discharge piping (not shown) extends from the chambers 14–16 which can be separately maintained at different temperature levels by circulating hot or cool fluids, depending on the mixing operation, through the chambers individually. At its upper end the mixer barrel B is provided with a support flange 17 to support a hopper 18 in axial alignment with the mixing chamber 19 so that the hopper 18 is capable of supplying material directly to the upper end of the chamber 19. The shaft 11 has interrupted worm threads or blades 20 extending helically thereon and interrupted at 180° intervals to provide gaps 21 between the thread sections 20. The thread portions 20 are so pitched that material is fed from the upper end of the barrel B down to a side discharge opening 22. Provided in the gaps 21 are pairs of pins 23 which will be later described in detail and which cooperate with the worm sections 20 in a manner to be accommodated in the gaps 21 between the worm sections 20 as the shaft 11 is both reciprocated and rotated in timed relation to the disposition of pins 23.

If the threads or blades which form members 20 are interrupted at 180° intervals as shown, then the shaft 11 must rotate 180° during both the forward and rearward portions of the reciprocatory stroke. In the mixing operation in which the stationary pins 23 on the barrel portion 10 actually are passed through the interruptions 21 in the thread of the worm or screw, some of the material is always held back by each of the fixed pins 23 to mix with the material behind. Instead of batches of material being conveyed through in disk form, the material is conveyed through the mixing and kneading zone enclosed by barrel section 10 in loops and there are no dead spaces wherein unmixed material can remain.

At its upper end the shaft 11 is slightly reduced in diameter and extends up into the hopper 18. A removable sleeve 24 is accommodated on the shaft 11 and forms a part thereof, the sleeve 24 being provided with a continuous advancing thread 25 which not only serves to advance the material into the chamber 19 but also closely fits the upper end of barrel member 10 so that the upper end of the shaft 11 is thereby journaled by the barrel section 10, only a running clearance being provided between the continuous thread 25 and the inner peripheral surface of barrel section 10. Also mounted on the upper end 11a of the shaft 11 is an agitator bar generally designated 26 having a hub portion 27 and an agitator bar 28 with downwardly inclined ends 28a. Because the shaft 11 is hollow, a circulating fluid supply pipe 29 and exit pipe 30 may be provided as shown to achieve a proper temperature control in the interior of shaft 11.

The sleeve 24, which rotates and reciprocates with shaft 11, is readily removable to permit the mounting of another sleeve having continuous advancing threads of different pitch so that the advancing speed of the material through the mixer barrel B may be varied as desired.

To facilitate start-up operations, a vertically movable slide gate 31 is provided, connected by means of a clevis 32 to the piston rod 33 of a fluid pressure operated cylinder 34 which is supported in fixed position on the barrel B by bracket members 35. At its lower end the shaft 11 is provided with reversely pitched, continuous threads 36 having a tapered root which move the material upwardly in a counterflow direction which assures a steady discharge of material at exit 22. The thread 36 is reversely pitched in the sense that it is of opposite hand with respect to both thread 25 and the thread sections 20.

At its lower end the barrel B is flanged as at 37 and supported on a transmission housing generally designated 38. The transmission housing 38 includes an outer, box-like housing 39 mounting circumferentially spaced support brace members 40 on which the barrel support ring member 41 is supported, the spaces 42 between the arms 40 providing clean-out access openings. As FIG. 1 indicates, the threads 36 are snugly received within the barrel portion 10 in a manner so that only a running clearance is provided between the threads 36 and barrel section 10, and a seal 43 is provided at the lower end of the barrel section 10 as shown.

Supported by inboard and outboard bearings 44 and 45, respectively, beneath the lower end of shaft 11 is an eccentric shaft generally designated 46 which has an eccentric midportion 47 as shown. A double-bearing or reciprocable thrust bearing member generally designated 48 has vertically spaced apart thrust roller bearings 49 journaling the reduced lower end portion 11b of the shaft 11, and horizontally spaced roller bearings 50 journaling eccentric sections 47a of the eccentric portion 47. The double bearing member 48 is guided in its vertical reciprocatory travel by a vertical shaft 51 which extends from the bearing member 48 and is received in a slide bearing 52 as shown in FIG. 1. Rotation of bearing member 48 is also restrained by these parts. A spline sleeve 53 is fixed on the shaft 11 above the shaft portion 11b and mounts a bevel gear 54 which revolves the shaft 11 while at the same time providing for vertical reciprocatory movement of the shaft relative to the hub portion 54a of the gear 54. Roller bearings 55 interposed between the gear hub 54a and a transmission housing support sleeve section 56 journal the gear hub 54a.

Provided to drive the transmission shaft 46 in a manner to provide both reciprocatory and rotary movement of shaft 11 is a motor 57 having an armature shaft 58. The shaft 58 is connected by means of suitable bevel gearing 59 with a worm 60 driving a gear 61 fixed to shaft 46. At its opposite end the shaft 46 mounts a bevel gear 62 in mesh with the bevel gear 54.

Figure 2:
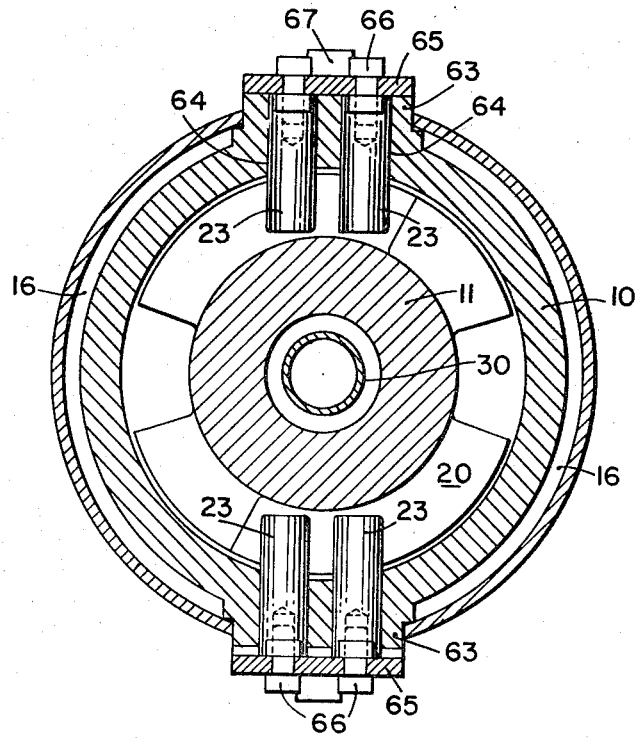
FIG. 2 is a transverse sectional view taken on the line 2—2 of FIG. 1.
Figure 3:
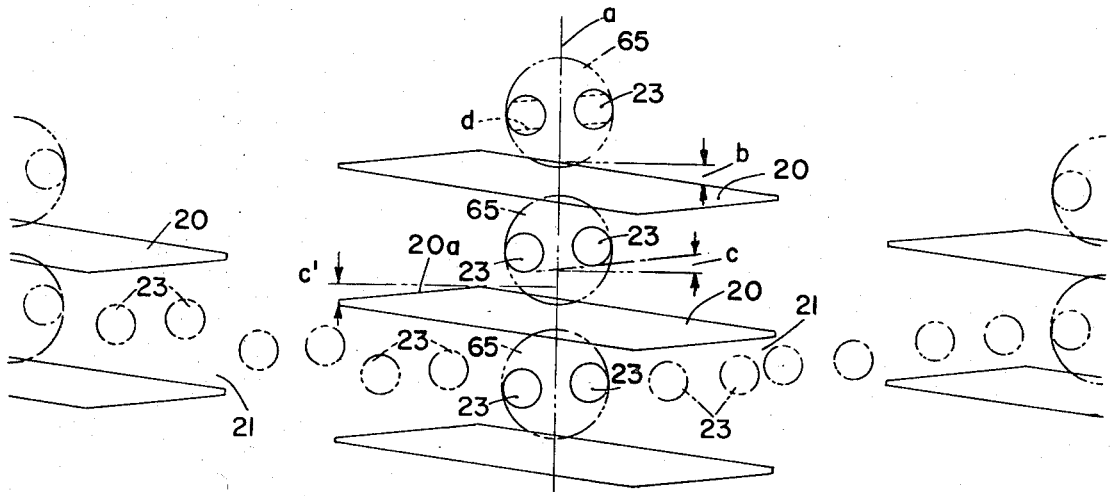
FIG. 3 is a partial development of the worm and associated casing pins, illustrating the manner of interengagement between the interrupted worm and pins.

As FIG. 2 indicates, the barrel member 10 has projecting boss portions 63 provided with openings 64. Plates 65 are provided to cover the openings 64 and mount the pairs of pins 23 in the manner indicated in FIG. 2 by means of bolt members 66 and bolt retaining members 67. As FIG. 3 indicates, the interrupted flight sections 20 are pitched relative to a plane normal to the axis $a$ at the angle $b$. As FIG. 3 also indicates, the pairs of pins 23 are pitched in the opposite direction at substantially the same angle $c$ relative to a plane normal to the axis, the angle $c$ also corresponding substantially to the angle $c'$ between the end faces 20a of the flights 20 and a plane normal to the axis $a$ as shown. If desired for some operations, the pins 23 could be slotted at their sides in the manner indicated at $d$ in FIG. 3, or the pins 23 could be replaced by a single tooth of the same width as the pair of pins 23 which is also mounted on a removable plate 65. However, the pairs of pins 23 are preferred.

In operation, material is fed continuously to the machine is metered quantities through the feed hopper 18. Because of the reciprocation and rotation of agitator bar 28, a unique agitating and debridging effect is obtained in the hopper 18. Typical materials which may be mixed in the machine are various plastics which are being mixed with a measured amount of carbon. Typical plastics which may be processed in the machine are polyethylene, polypropylene, and polystyrene. A hot fluid piped to chambers 14–16 and through pipes 29 and 30 soon heats the plastic material or materials fed to the upper end of chamber 19 sufficiently to achieve the desired degree of fluidity. When the shaft 11 is moved downwardly, the mass in the chamber 19 is moved downwardly except for the portion which is detained by the pins 23. At this time the rotation of shaft 11 assures a thorough mixing and kneading action, the surfaces 20a of the interrupted flights 20 passing closely adjacent the pins 23 to achieve the desired intermixing. The material thus proceeds through the chamber 19 and finally exits at opening 22.

It is to be understood that various elements may be substituted for the elements which are described and claimed to accomplish the same or similar results without departing from the spirit of the invention or the scope of the appended claims.

I claim:

1. In a continuous mixer, kneader, or reactor for plastic materials and the like: a generally axially disposed barrel forming a generally axially extending, material accommodating chamber; means for supplying material to be processed to the one end of said barrel; chamber outlet means provided in said barrel near the other end thereof; a generally axially disposed mixing shaft having interrupted helical flights thereon provided in said chamber; kneading members projecting radially inwardly of said barrel into said chamber and disposed in cooperating relationship to coact with said flights; means for revolving and reciprocating said shaft and passing said kneading members through the gaps between said interrupted flights; said latter means including: a thrust absorbing, rotary drive shaft having an eccentric portion adjacent an end of said mixing shaft connected with the said end of the mixing shaft to reciprocate the mixing shaft, and means connecting another portion of said drive shaft with the mixing shaft to rotate the mixing shaft.

2. The combination defined in claim 1 wherein the means connecting the eccentric portion of the drive shaft means with the mixing shaft comprises a double bearing member journaling the eccentric portion and the lower end of the mixing shaft.

3. In a mixer, kneader, and reactor for plastic materials and the like: a generally vertically disposed barrel forming a generally vertically extending, material accommodating chamber; a hopper at the upper end of said barrel to which the material may be supplied; a chamber outlet provided in the side of said barrel near the lower end thereof; a generally vertically disposed mixing shaft having interrupted helical flights thereon provided in said chamber and extending below said chamber outlet; kneading members projecting radially inwardly of said barrel into said chamber and disposed in cooperating relationship to coact with said flights; a reciprocable thrust bearing rotatably receiving the lower end of the mixing shaft; means for revolving said shaft; and vertical thrust absorbing means for simultaneously reciprocating said thrust bearing and shaft means, and passing said kneading members through the gaps between said interrupted flights.

4. The combination defined in claim 3 in which said reciprocable bearing is mounted on the eccentric portion of an eccentric drive shaft which also funishes the drive for rotating said mixing shaft.

5. The combination defined in claim 3 in which agitator member means disposed in said hopper means is connected to said shaft to be reciprocated and revolved thereby.

6. In a continous mixer, kneader, or reactor for plastic materials and the like: generally axially disposed barrel forming a generally axially extending, material accommodating chamber; means for supplying material to be processed to the one end of said barrel; chamber outlet means provided in said barrel near the one end thereof; a generally axially disposed mixing shaft having interrupted helical flights thereon provided in said chamber; kneading members projecting radially inwardly of said barrel into said chamber and disposed in cooperating relationship to coact with said flights; means for revolving and reciprocating said shaft and passing said kneading members through the gaps between said interrupted flights, including thrust absorbing support means for the reciprocating shaft; a jacket for said barrel; said jacket being interrupted by bosses provided on said barrel; and said kneading members including plates secured to said bosses and having projecting kneader teeth extending through said bosses into said chamber.

7. In a continuous mixer, kneader, or reactor for plastic materials and the like: a generally axially disposed barrel forming a generally axially extending, material accommodating chamber; means for supplying material to be processed to the one end of said barrel; chamber outlet means provided in said barrel near the other end thereof; a generally axially disposed mixing shaft having interrupted helical flights thereon provided in said chamber; kneading members projecting radially inwardly of said barrel into said chamber and disposed in cooperating relationship to coact with said flights; means for revolving and reciprocating said shaft and passing said kneading members through the gaps between said interrupted flights, including thrust absorbing support means for the reciprocating shaft; said kneading members comprising individual spaced apart mounts with pairs of separate pins set at an angle relative to a plane normal to the axis of the shaft to cooperate with the helical flights.

8. The combination defined in claim 7 in which each pair of pins extend inwardly from a plate member detachably secured over an opening in said barrel means.

9. The combination defined in claim 7 in which the flights extend at an opposite angle to the angle of the pins and have end faces generally parallel to the angle at which the said pins are set.

References Cited

UNITED STATES PATENTS

| | | |
|---|---|---|
| 2,731,247 | 1/1956 | Hudry. |
| 3,224,739 | 12/1965 | Schuur _ _ _ _ _ _ _ _ _ _ _ _ 18—12X |
| 3,278,986 | 10/1966 | Welt. |
| 3,334,163 | 8/1967 | Gilbert. |
| 3,367,635 | 2/1968 | Gresch. |
| 3,191,234 | 6/1965 | Hendry. |

CHARLES W. LANHAM, Primary Examiner

M. O. SUTTON, Assistant Examiner

U.S. Cl. X.R.

18—30